United States Patent
McPartland

(10) Patent No.: US 11,583,364 B2
(45) Date of Patent: Feb. 21, 2023

(54) IMPLANT SCALER

(71) Applicant: Sylvia McPartland, Houston, TX (US)

(72) Inventor: Sylvia McPartland, Houston, TX (US)

(*) Notice: Subject to any disclaimer, the term of this patent is extended or adjusted under 35 U.S.C. 154(b) by 192 days.

(21) Appl. No.: 16/681,497

(22) Filed: Nov. 12, 2019

(65) Prior Publication Data

US 2021/0137638 A1     May 13, 2021

(51) Int. Cl.
*A61C 3/025* (2006.01)
*A61C 8/00* (2006.01)
*A61C 3/02* (2006.01)
*A61C 3/00* (2006.01)

(52) U.S. Cl.
CPC .............. *A61C 3/025* (2013.01); *A61C 3/00* (2013.01); *A61C 3/02* (2013.01); *A61C 8/0089* (2013.01)

(58) Field of Classification Search
CPC ....... A61C 3/0002; A61C 8/0089; A61C 3/02; A61C 3/00; A61C 17/00; A61C 17/20
USPC ......................................................... 433/143
See application file for complete search history.

(56) References Cited

U.S. PATENT DOCUMENTS

| | | | |
|---|---|---|---|
| 4,552,531 A | | 11/1985 | Martin |
| 4,759,713 A | * | 7/1988 | Heiss ............... A61C 3/00 433/141 |
| 5,004,419 A | | 4/1991 | Kline |
| 5,044,951 A | * | 9/1991 | Sheridan ........... A61C 19/04 33/514 |
| 5,244,390 A | * | 9/1993 | Lazzara ............. A61C 17/00 433/143 |
| 5,676,544 A | * | 10/1997 | Urban ................ A61C 3/00 433/147 |
| 6,109,918 A | | 8/2000 | Hammond et al. |
| 6,241,519 B1 | * | 6/2001 | Sedelmayer ....... A61C 19/04 433/141 |
| 6,309,219 B1 | * | 10/2001 | Robert ............... A61C 3/14 433/144 |
| 6,322,362 B1 | | 11/2001 | Holms |
| 7,077,653 B2 | * | 7/2006 | Haab ................. A61C 3/00 433/143 |
| 9,597,160 B1 | * | 3/2017 | Gregg, II ......... A61C 8/0006 |
| 9,681,927 B2 | * | 6/2017 | Garbo .............. A61C 3/00 |
| D803,400 S | * | 11/2017 | Latif ................ D24/154 |
| 10,646,305 B2 | * | 5/2020 | Lee ................... A61C 3/06 |

(Continued)

FOREIGN PATENT DOCUMENTS

| | | | |
|---|---|---|---|
| CN | 108852545 A | * | 11/2018 |
| JP | 2018021882 A | * | 2/2018 |

(Continued)

OTHER PUBLICATIONS

Guggenberger Sandra "DE 202016100241 U1 Machine Translated", 2016 (Year: 2016).*

(Continued)

*Primary Examiner* — Heidi M Eide
*Assistant Examiner* — Holly T. To
(74) *Attorney, Agent, or Firm* — Tumey L.L.P.; Eric M. Adams; Tod T. Tumey

(57) ABSTRACT

A dental scaler for use in cleaning dental implants. The scaler includes a handle having a generally central axis extending along the length thereof, a handle tip end affixed to the handle, and a rod affixed to the handle tip end, wherein the rod comprises at least six sections, one angle, and a curved tip.

7 Claims, 4 Drawing Sheets

(56) References Cited

U.S. PATENT DOCUMENTS

| | | | |
|---|---|---|---|
| 2006/0029906 A1* | 2/2006 | Hill | A61C 3/00 433/141 |
| 2007/0003903 A1* | 1/2007 | Meuchel | A61B 90/92 433/141 |
| 2008/0076089 A1* | 3/2008 | Vu | A61C 3/00 433/143 |
| 2010/0184000 A1 | 7/2010 | Beach | |
| 2015/0125816 A1* | 5/2015 | Ladd | A61C 3/00 433/147 |
| 2016/0074135 A1* | 3/2016 | Aboalshamat | A61C 3/00 433/147 |
| 2016/0081764 A1* | 3/2016 | Yasushi | A61C 17/20 433/119 |
| 2016/0228221 A1 | 8/2016 | Cho | |
| 2018/0193109 A1* | 7/2018 | Douglas | A61C 3/00 |
| 2018/0235727 A1* | 8/2018 | Rubino | A61C 19/043 |
| 2018/0333243 A1* | 11/2018 | Kim | A61C 3/00 |
| 2020/0237485 A1* | 7/2020 | Pineyro | A61C 8/0056 |

FOREIGN PATENT DOCUMENTS

| | | | |
|---|---|---|---|
| WO | WO-0160279 A1 * | 8/2001 | A61C 3/00 |
| WO | WO-2016134405 A1 * | 9/2016 | G06K 7/10009 |
| WO | WO-2017173333 A2 * | 10/2017 | A61C 8/0089 |
| WO | 2018217759 | 11/2018 | |
| WO | WO-2019204613 A * | 10/2019 | A61C 17/00 |

OTHER PUBLICATIONS

Renvert, "Peri-implant health, peri-implant mucositis, and peri-implantitis_ Case definitions and diagnostic considerations", 2018 (Year: 2018).*

International Search Report and Written Opinion for Application No. PCT/US20/60260 dated Feb. 3, 2021.

* cited by examiner

IMPLANT SCALER

BACKGROUND

1. Field of Inventions

The field of this application and any resulting patent relates to a dental scaler, and in particular, to a dental scaler having a configuration designed to navigate around dental implants.

2. Description of Related Art

Various dental scalers have been proposed and utilized by dental professionals, including some of the dental scalers disclosed in the references appearing on the face of this patent. However, those dental scalers lack all the features of the dental scalers covered by any patent claims below. As will be apparent to a person of ordinary skill in the art, any dental scalers covered by claims of the issued patent solve many of the problems that prior art dental scalers have failed to solve. Also, the dental scalers covered by at least some of the claims of this patent have benefits that could be surprising and unexpected to a person of ordinary skill in the art based on the prior art existing at the time of invention.

SUMMARY

One or more specific embodiments disclosed herein includes a dental scaler for use in cleaning dental implants comprising: a handle having a generally central axis extending along the length thereof; a handle tip end affixed to the handle; and a rod affixed to the handle tip end, wherein the rod comprises at least six sections, one angle, and a curved tip.

One or More specific embodiments disclosed herein includes a dental scaler for use in cleaning dental implants, comprising: a handle having a generally central axis extending along the length thereof; a handle tip end affixed to the handle; and a rod affixed to the handle tip end, wherein the rod comprises: at least six sections, wherein a first insert section is directly affixed to the handle tip end, a second section is attached to the first insert section, a third section is attached to the second section, a fourth section is attached to the third section, a fifth section is attached to the fourth section, and a sixth tip section is attached to the fifth section, wherein the sixth tip section is curved; and an angle at the junction of the third section and the fourth section.

One or more specific embodiments disclosed herein includes a dental scaler for use in cleaning dental implants, comprising: a handle having a generally central axis extending along the length thereof; a handle tip end affixed to the handle; and a rod affixed to the handle tip end, wherein the rod comprises: a first insert section attached to a second section, wherein the first insert section and second section are axially aligned with the handle; a third section attached to the second section, wherein the third section deviates from the central axis of the handle; an angle at the junction of the third section and a fourth section, wherein the fourth section crosses the central axis of the handle; a fifth section attached to the fourth section; and a sixth section attached to the fifth section, wherein the sixth section is curved and outside the central axis of the handle.

DETAILED DESCRIPTION

1. Introduction

Figure 1:
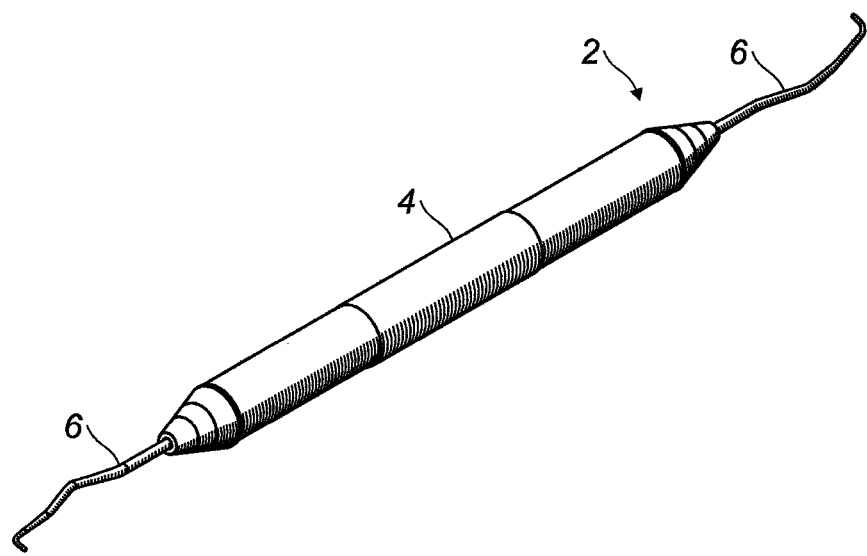
FIG. 1 is a perspective view of an embodiment of an implant scaler.

A detailed description will now be provided. The purpose of this detailed description, which includes the drawings, is to satisfy the statutory requirements of 35 U.S.C. § 112. For example, the detailed description includes a description of the inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in any printed publication, dictionary, or issued patent.

2. Certain Specific Embodiments

Now, certain specific embodiments are described, which are by no means an exclusive description of the inventions. Other specific embodiments, including those referenced in the drawings, are encompassed by this application and any patent that issues therefrom.

One or more specific embodiments disclosed herein includes a dental scaler for use in cleaning dental implants comprising: a handle having a generally central axis extending along the length thereof; a handle tip end affixed to the handle; and a rod affixed to the handle tip end, wherein the rod comprises at least six sections, one angle, and a curved tip.

One or more specific embodiments disclosed herein includes a dental scaler for use in cleaning dental implants, comprising: a handle having a generally central axis extending along the length thereof; a handle tip end affixed to the handle; and a rod affixed to the handle tip end, wherein the rod comprises: at least six sections, wherein a first insert section is directly affixed to the handle tip end, a second section is attached to the first insert section, a third section is attached to the second section, a fourth section is attached to the third section, a fifth section is attached to the fourth section, and a sixth tip section is attached to the fifth section, wherein the sixth tip section is curved; and an angle at the junction of the third section and the fourth section.

One or more specific embodiments disclosed herein includes a dental scaler for use in cleaning dental implants, comprising: a handle having a generally central axis extending along the length thereof; a handle tip end affixed to the handle; and a rod affixed to the handle tip end, wherein the rod comprises: a first insert section attached to a second section, wherein the first insert section and second section are axially aligned with the handle; a third section attached to the second section, wherein the third section deviates from the central axis of the handle; an angle at the junction of the third section and a fourth section, wherein the fourth section crosses the central axis of the handle; a fifth section attached to the fourth section; and a sixth section attached to the fifth section, wherein the sixth section is curved and outside the central axis of the handle.

In any one of the instruments disclosed herein, the dental scaler may comprise a handle, wherein the handle has a handle tip end affixed to each end.

In any one of the instruments disclosed herein, the dental scaler may comprise a handle, wherein the handle comprises a handle tip end, and further wherein the handle tip end is detachable from the handle.

In any one of the instruments disclosed herein, the dental scaler may comprise a handle and a handle tip end, wherein a rod is detachable from the handle tip end.

In any one of the instruments disclosed herein, the dental scaler may comprise a handle, wherein the handle comprises a first end, a middle portion, and a second end.

In any one of the instruments disclosed herein, the dental scaler may comprise a handle, wherein the first end and the second end of the handle comprise a knurled surface.

3. Specific Embodiments in the Figures

The drawings presented herein are for illustrative purposes only and are not intended to limit the scope of the claims. Rather, the drawings are intended to help enable one having ordinary skill in the art to make and use the claimed inventions.

Referring to FIGS. 1-4, a specific embodiment, e.g., version or example, of an implant scaler is illustrated. These figures may show features which may be found in various specific embodiments, including the embodiments shown in this specification and those not shown.

FIG. 1 shows an implant scaler 2. In embodiments, implant scaler 2 may comprise a handle 4 and one or more rods 6, which may be affixed to handle 4. The one or more rods 6 may be affixed to opposite ends of handle 4. In the embodiment shown in FIG. 1, the one or more rods 6 are detachable from handle 4, but it is possible to manufacture implant scaler 2 as a unitary structure.

Figure 2:
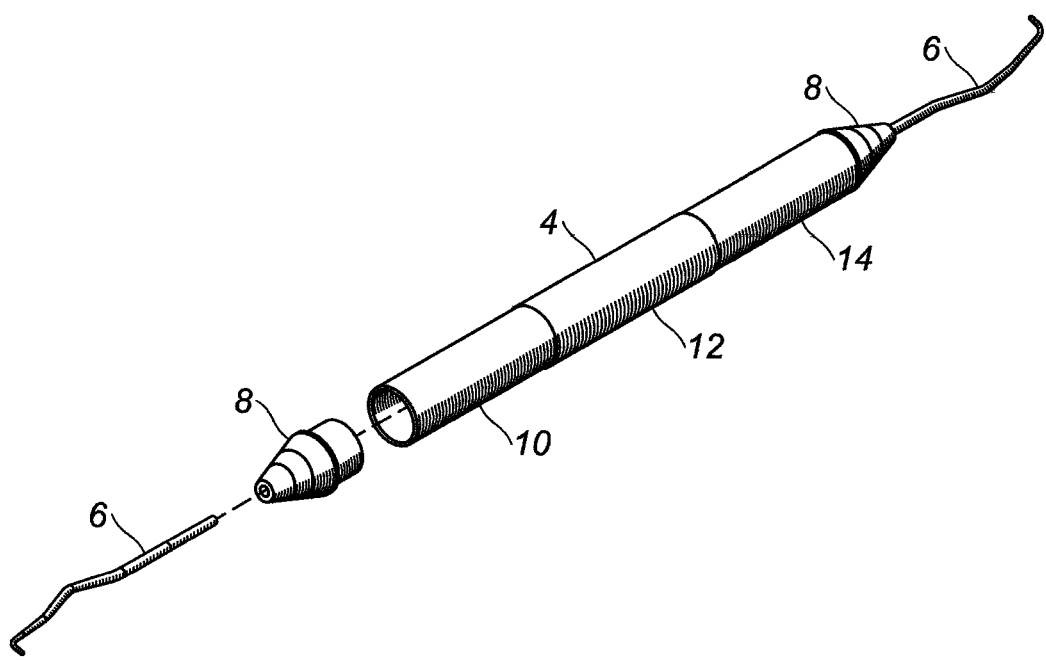
FIG. 2 is an exploded view of an embodiment of an implant scaler.

FIG. 2 shows an exploded view of an embodiment of implant scaler 2. In embodiments, handle 4 may be cylindrical with a generally central axis. In embodiments, handle 4 may comprise one or more handle tip ends 8. In embodiments, handle 4 may comprise a first end 10, a middle portion 12, and a second end 14. In embodiments, first end 10 and second end 14 may each comprise a knurled surface. Further, in embodiments, first end 10 and second end 14 may each have a length of about 28 mm, and middle portion 12 may have a length of about 87 mm. In embodiments, handle 4 may have an internal diameter of about 9.3 mm, and handle 4 may have an outer diameter of about 9.5 mm. In embodiments, handle 4, may be comprised of stainless steel.

Additionally, as shown in FIGS. 1 and 2, in embodiments, one handle tip end 8 may be press fit to the first end 10, as shown in FIG. 2. In embodiments, one handle tip end 8 may also be press fit to the second end 14. In embodiments, the one or more handle tip ends 8 may comprise a round section 16 and a cone section 18. Further, in embodiments, round section 16 may have an outer diameter less than the inner diameter of first end 10 and second end 14. In embodiments, round section 16 may have a length of about 0.4 mm. Alternatively, handle 4 may comprise only one handle tip end 8.

Figure 3:
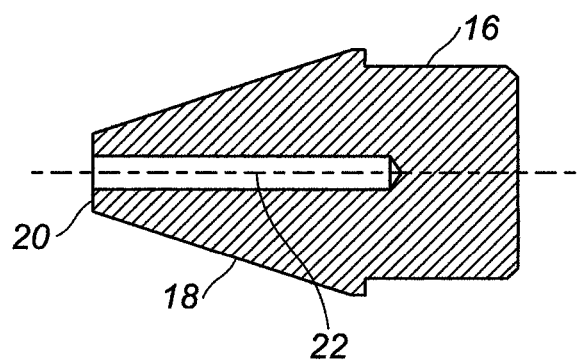
FIG. 3 is a side view of an embodiment of a handle tip end.

FIG. 3 illustrates an embodiment of handle tip end 8. In embodiments, at the widest part of cone section 18, which is adjacent round section 16, the outer diameter of cone section 18 may be about 9.3 mm. In embodiments, cone section 18 may taper to an outer diameter of about 0.7 mm with about an 18° slope. In embodiments, a top 20 of cone section 18 may comprise a flat surface. In embodiments, handle tip end 8 may comprise a bore 22. In embodiments, bore 22 may be positioned axially and concentrically. Further, in embodiments, bore 22 may extend axially into handle tip end 8. In embodiments, cone section 18 may comprise an entirely knurled or partially knurled surface. In embodiments, the one or more handle tip ends 8 may be comprised of stainless steel.

Figure 4A:
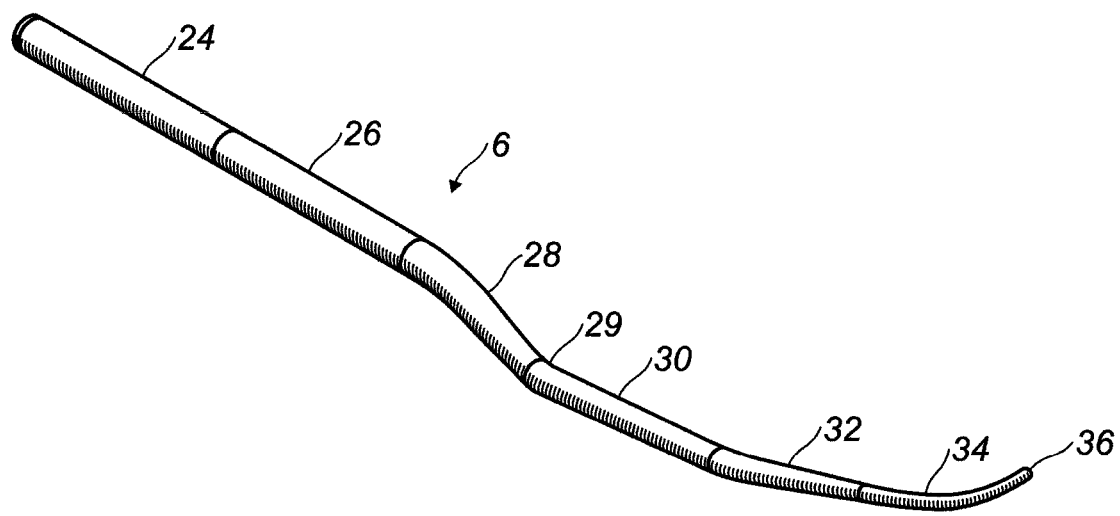
FIG. 4A is a perspective view of an embodiment of a rod.
Figure 4B:
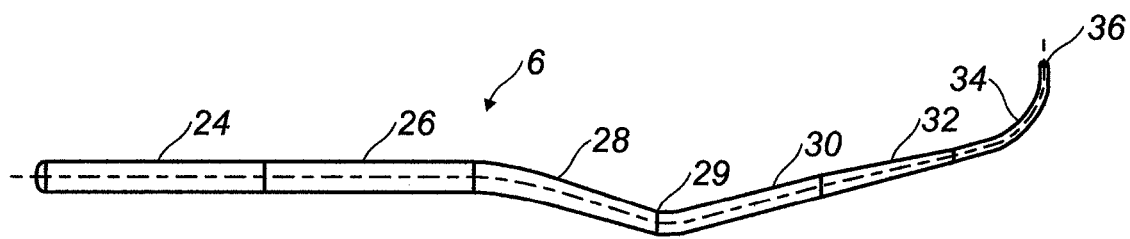
FIG. 4B is a side view of an embodiment of a rod.
Figure 4C:
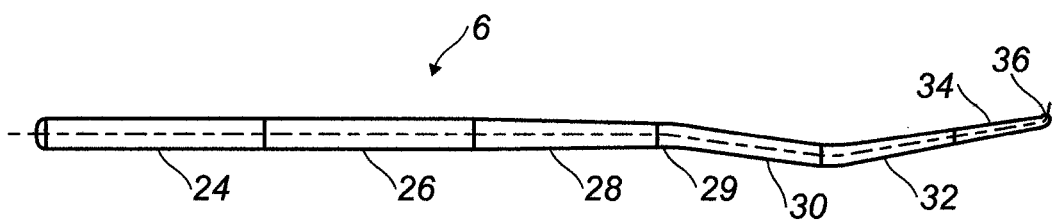
FIG. 4C is a rear view of an embodiment of a rod.

FIGS. 4A to 4C illustrate an embodiment of rod 6. In embodiments, rod 6 may comprise a plurality of sections. In embodiments, rod 6 may comprise a first insert section 24, a second section 26, a third section 28, a fourth section 30, a fifth section 32, and a sixth tip section 34. In embodiments, first insert section 24 may be inserted into bore 22 such that handle 4 and rod 6 may be affixed to each other. As shown in FIG. 4A, as rod 6 progresses from first insert section 24 to sixth tip section 34, the diameter of rod 6 may decrease.

In embodiments, first insert section 24 may have a diameter of about 1.3 mm. In embodiments, second section 26 may have a diameter of about 1.3 mm, and second section 26 may have a length of about 8.9 mm. In embodiments, third section 28 may have a diameter of about 1.14 mm, and third section 28 may have a length of about 7.7 mm. In embodiments, third section 28 may be curved so as to create an angle 29. In embodiments, angle 29 may be about 17°. In embodiments, fourth section 30 may have a diameter of about 0.95 mm, and fourth section 30 may have a length of about 6.9 mm. In embodiments, fourth section 30 may be curved so that an angle of about 15° exists. In embodiments, fifth section 32 may have a diameter of about 0.67 mm, and fifth section 32 may have a length of about 5.6 mm. In embodiments, sixth tip section 34 may have a diameter of about 0.44 mm, and it may have a length of about 3.8 mm. In embodiments, sixth tip section 34 may be curved. In embodiments, a tip 36 may have a diameter of about 0.4 mm. Additionally, for each of the sections 24, 26, 28, 30, 32, and 34, the diameter within each section may decrease as each section progresses from first insert section 24 to sixth tip section 34. In embodiments, rod 6 comprises a rigid, non-corrosive metal wire that is hard enough to function as a scaler and can be sterilized. In embodiments, rod 6 may be made of titanium.

Figure 5:
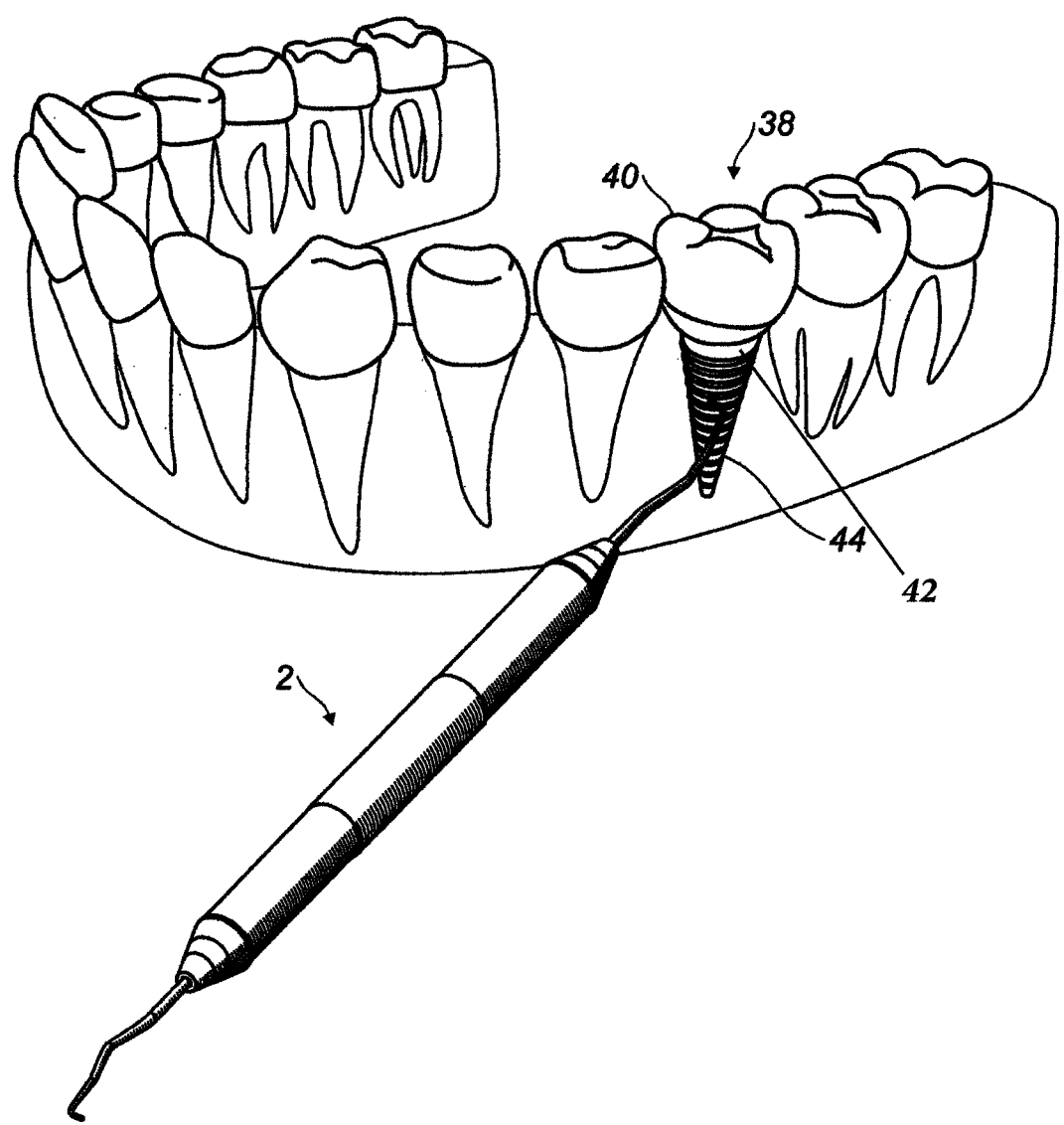
FIG. 5 depicts an implant sealer of FIG. 1 in use.

FIG. 5 depicts the implant scaler 2 in use with an embodiment of a dental implant 38. In embodiments, dental implant 38 may comprise a crown 40, an abutment 42 (not illustrated), and an implant 44. Implant 44 may comprise threads in embodiments. In embodiments, tip 36 of implant scaler 2 may be employed to clean between the threads of implant 44.

Generally, the above describes an improved implant scaler for dental professionals. More specifically, the improved implant scaler allows for cleaning between the threads of an implant, which may have threads located about 4 mm subgingivally or more. This provides easy access and a fine tip for thorough cleaning between the threads of the implant.

What is claimed is:

1. A dental scaler for use in cleaning dental implants, comprising:
    a handle comprising a central axis extending along the length thereof, and further comprising two ends;
    a handle tip end affixed to the handle; and
    a metal rod affixed to the handle tip end, wherein the rod comprises:
        a first insert section attached to a second section, wherein the first insert section and the second section are axially aligned with the handle, and further wherein the first section and the second section each comprise a diameter of 1.3 mm;
        a third section attached to the second section, wherein the third section deviates from the central axis of the handle, and further wherein the third section comprises a length of 7.7 mm;
        an obtuse angle at the junction of the third section and a fourth section, wherein the fourth section comprises a length of 6.9 mm;
        a fifth section attached to the fourth section, wherein the fifth section comprises a diameter of 0.67 mm; and
        a sixth section attached to the fifth section, wherein the sixth section is curved and outside the central axis of the handle, and further wherein the curved sixth section is capable of cleaning, through direct contact, between a plurality of threads of the dental implants, wherein at least one of the plurality of threads is located at least 4 mm subgingival.

2. The dental scaler of claim 1, wherein the dental scaler comprises a second handle tip end, wherein the second handle tip end is affixed to the handle opposite the handle tip end.

3. The dental scaler of claim 1, wherein the handle tip end is detachable from the handle.

4. The dental scaler of claim 1, wherein the rod is detachable from the handle tip end.

5. The dental scaler of claim 1, wherein the handle comprises a first end, a middle portion, and a second end.

6. The dental scaler of claim 5, wherein the first end and the second end comprise a knurled surface.

7. The dental scaler of claim 1, wherein the handle, the handle tip end, and the rod comprise a unitary structure.

\* \* \* \* \*